(12) United States Patent
Fujisawa et al.

(10) Patent No.: US 7,197,448 B2
(45) Date of Patent: Mar. 27, 2007

(54) METHOD OF ELECTRONIC SETTLEMENT WITH A MOBILE TERMINAL

(75) Inventors: Tomonori Fujisawa, Tokyo (JP); Shouji Satou, Kuroiso (JP)

(73) Assignee: Kabushiki Kaisha Eighting, Tokyo (JP)

( * ) Notice: Subject to any disclaimer, the term of this patent is extended or adjusted under 35 U.S.C. 154(b) by 639 days.

(21) Appl. No.: 10/318,019

(22) Filed: Dec. 13, 2002

(65) Prior Publication Data

US 2003/0120612 A1    Jun. 26, 2003

(51) Int. Cl.
*G06Q 40/00*    (2006.01)
(52) U.S. Cl. ............... 703/35; 705/41; 455/556.1; 455/556.2
(58) Field of Classification Search ............ 705/41, 705/35; 235/454; 340/5.53, 5.83; 455/556.1, 455/556.2
See application file for complete search history.

(56) References Cited

U.S. PATENT DOCUMENTS

| | | | |
|---|---|---|---|
| 6,282,656 B1 * | 8/2001 | Wang | 726/4 |
| 6,434,403 B1 * | 8/2002 | Ausems et al. | 455/556.2 |
| 6,947,571 B1 * | 9/2005 | Rhoads et al. | 382/100 |

FOREIGN PATENT DOCUMENTS

| | | |
|---|---|---|
| JP | 5-189465 | 7/1993 |
| JP | 11-511622 | 10/1999 |
| JP | 2000-78254 | 3/2000 |
| JP | 2000-341657 | 12/2000 |

OTHER PUBLICATIONS

Firms eye artificial retina breakthrough. The Daily Yomiuri. Tokyo, Jul. 13, 1999. (3 pages).*
IEEE Transactions on Electron Devices, vol. 47, No. 1, Jan. 2000, "A 1-mm 50 k-pixel IT CCD Image Sensor for Miniature Camera System", p. 65 to 70, by Keijirou Itakura, Toshihide Nobusada, Noboru Kokusenya, Ryoichi Nagayoshi, and Masayoshi Ozaki.

* cited by examiner

*Primary Examiner*—Richard E. Chilcot, Jr.
*Assistant Examiner*—Jennifer Liversedge
(74) *Attorney, Agent, or Firm*—Manabu Kanesaka

(57) ABSTRACT

An electronic settlement system with extremely high security based on the use of a mobile terminal with an electronic camera therein. Display units for commodity information provided at a place for payment with cash, a sales control server for managing the display units, a server for controlling the mobile terminals, and an authentication server authorizing the mobile terminals are connected to each other through the Internet, and the authentication server and the sales control server are connected to each other through a dedicated communication line. The commodity information comprising characters and displayed on the display unit are photographed with the mobile terminal, the image data is transmitted via the mobile terminal server to the authentication server, the authentication server authenticates the mobile terminal and reproduces the image data to the character commodity information, and the authenticated personal information and the commodity information are transmitted via the dedicated communication line to the sales control server.

7 Claims, 8 Drawing Sheets

| No | Item Name | Displayed Item | Code |
|---|---|---|---|
| 1 | Sales Terminal Code 1 | [SS198512-1] | Fdjkljdfklgldkkkkkk |
| 2 | Sales Terminal Code 2 | [SS198512-2] | Fdjkljdfklgldkkkkkk |
| 3 | Transaction Code 1 | [SS198512-NO-1] | 125frt8964455 |
| 4 | Transaction Code 2 | [SS198512-NO-2] | 125frt8964455 |
| 5 | Commodity Code 1 | [SS198512-SO-1] | Kkd883376 |
| 6 | Commodity Code 2 | [SS198512-SO-2] | Kkd883376 |
| 7 | Price Code 1 | [SS198512-PO-1] | 2300 |
| 8 | Price Code 2 | [SS198512-PO-2] | 2300 |
| 9 | Date Code 1 | [SS198512-DA-1] | 2000/05/23 |
| 10 | Date Code 2 | [SS198512-DA-2] | 2000/05/23 |
| 11 | Other 1 | [SS198512-EX-1] | |
| 12 | Other 2 | [SS198512-EX-2] | |

METHOD OF ELECTRONIC SETTLEMENT WITH A MOBILE TERMINAL

FIELD OF THE INVENTION

The present invention relates to an electronic settlement method utilizing a mobile terminal with an electronic camera or an artificial retina chip incorporated therein, and an authentication server and a mobile terminal for electronic settlement.

BACKGROUND TECHNOLOGY

There have been mainly used plastic cards with a magnetic tape adhered thereon as represented by credit cards in settlement for payment of prices or fees for commodities and services, and when settlement to be made, an individual is identified by having a card reader read information on the individual stored in the magnetic tape and verifying the read information to data specific to the managing business organization. Recently, criminal acts such as falsification of cards frequently occur, however, and the use of IC cards which can hardly be falsified has been becoming more and more frequent.

The electronic settlement making use of online authentication also has been put into practical use, and in addition to the use of credit cards, various efforts for making it harder to decode a card number have been made by enhancing the security based on combined use of the encryption technology and personal identification numbers. An IC card has a substantially larger capacity for information storage as compared to the conventional types of cards, and its portability is excellent, but the user's awareness of carrying the IC card is rather weak, and is still at the level as indicated by the expression of "Probably it's in my wallet/purse". A credit card is often put in a wallet/purse, and therefore there is the risk that it may be stolen or lost.

Recently cellular phones are very popular, and while their portability is lower than that of credit cards, the users are well aware that they have the cellular phones with them. In addition, the cellular phone hardly becomes an object for theft because it is not well adapted to be used by a third party, and therefore electronic settlement systems based on use of cellular phones have been developed.

There has been well known the method in which, after a user order from a commodity by using a cellular phone, the user calls the settlement server, then inputs key information such as a credit card number or the like, and performs settlement with the credit card. In this electronic settlement method, when key information such as a credit number is transmitted or received, the Internet where the risk of illegal use of stolen data is high is not utilized, and therefore the voice communication mode is used and information is transmitted by operating the push buttons. The transmitted information by operating the push buttons is encrypted, but the information is still not sufficiently secured.

DISCLOSURE OF THE INVENTION

The present invention proposes an electronic settlement system with extremely high security based on the use of a mobile terminal with an electronic camera or an artificial retina chip incorporated therein.

In the electronic settlement method with a mobile terminal according to the present invention, display units for commodity information provided at a place for payment with cash, a sales control server for managing the display units, a server for controlling mobile terminal each having an electronic camera or an artificial retina chip incorporated therein, and an authentication server authorizing the mobile terminals are connected to each other through a network such as the Internet with the authentication server and the sales control server connected to each other through a dedicated communication line, and the commodity information comprising characters and displayed on the display unit are photographed with the mobile terminal, the image data is transmitted via the mobile terminal server to the authentication server, the authentication server authenticates the mobile terminal and reproduces the image data to the character commodity information, and the authenticated personal information and the commodity information are transmitted via the dedicated communication line to the sales control server. The electronic settlement method according to the present invention can provide extremely high security, because, in this method, only the commodity information converted to image data is transmitted through a network with low level security such as the Internet, and personal data required for settlement is transmitted through the dedicated communication line with established security.

It is preferable that encrypted commodity information is displayed on the display unit. Further it is preferable that duplexed character commodity information is displayed on the display unit. With the present invention, the security in settlement can further be enhanced.

The authentication server according to the present invention comprises a mail folder monitoring section for monitoring in-coming electronic mails each containing a terminal ID and image data; a terminal ID storage section in which each terminal ID is registered and stored; a personal information storage section in which registered personal information corresponding to the terminal IDs stored are stored; a terminal ID determination section for checking the in-coming mail and determining whether the terminal ID included in the in-coming mail has been a registered one or not; an image recognition block for recognizing the image data taken out from the in-coming mail as an image and generating the commodity information comprising characters; and a permission information generating section for generating permission information consisting of the commodity information and personal information.

The mobile terminal according to the present invention comprises an artificial retina chip with a lens and an artificial retina LSI integrated therewith, a control section for the artificial retina chip, and a communication section, and a program constituting the control section comprises a system control section for controlling the system as a whole, a photographing controlling section for controlling photographing, and an image memory section for temporally storing therein the photographed image data.

BEST MODE FOR CARRYING OUT THE INVENTION

Preferable embodiments of the present invention are described below with reference to the attached drawings.

Figure 1:
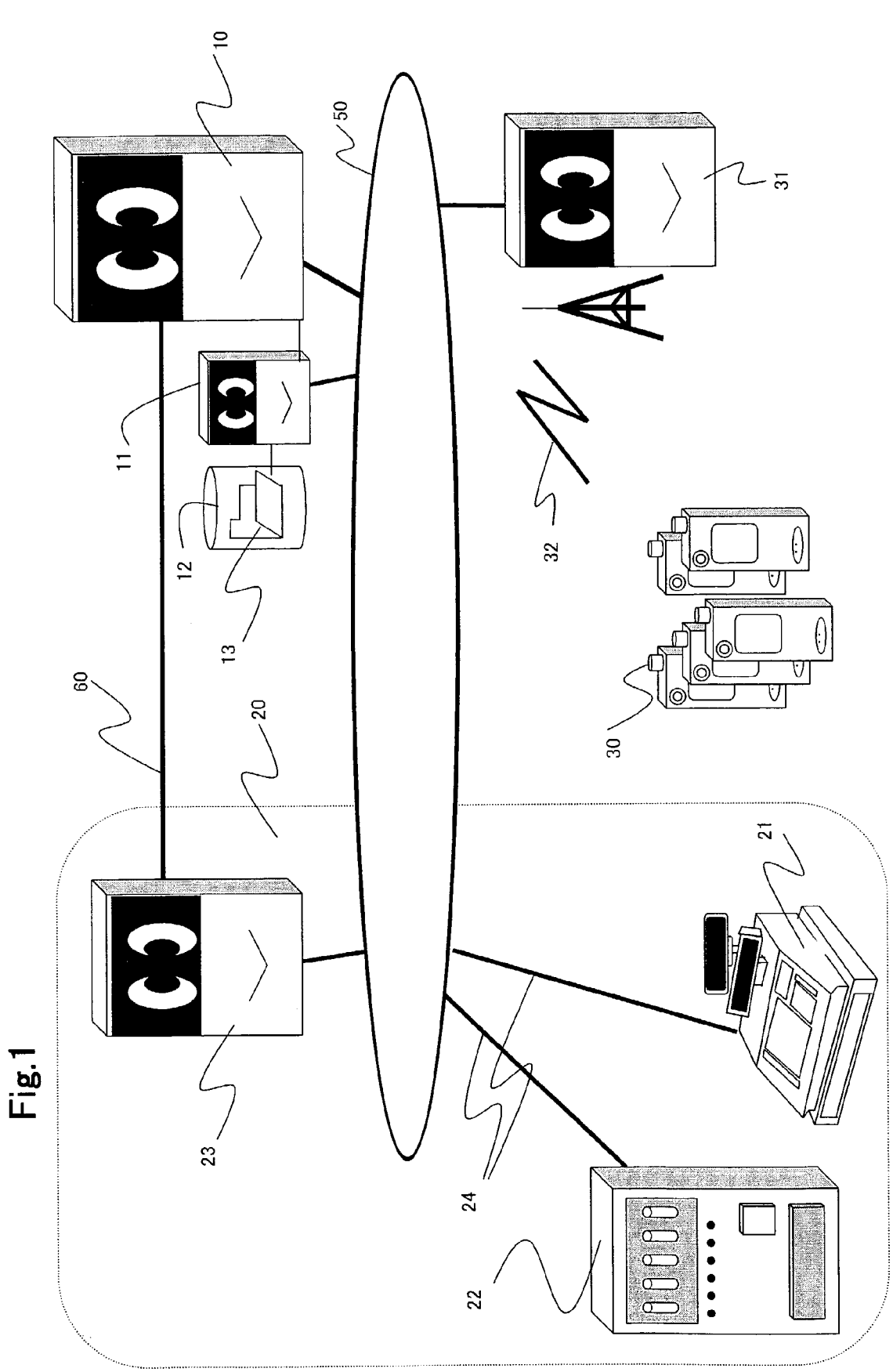
FIG. 1 is an explanatory view showing the electronic settlement method according to the present invention as a whole.

FIG. 1 is a view showing the electronic settlement system according to the present invention as a whole, and displayed that a block 20 enclosed by the dotted line in the figure is a state where commodity information display units (registers) 21 installed at sites for selling various types of commodities or providing various types of services, an automatic selling machines 22 with a display unit for commodity information, and a sales control server 23 for controlling the units 21 and machines 22 are connected to each other through a network 50 such as the Internet. The reference numeral 24 is a network line connecting the display units (registers) 21, and the automatic selling machines 22 to the sales control server 23.

In the conventional technology, payment with a credit card, a cash card, a debit card or the like is performed in this block 20 in which the display units (registers) 21, or the automatic selling machine 22 is directly connected through the network line 24 to the sales control server 23, and when a consumer uses the credit card for payment, a card reader separated from each of the system components above is used for authenticating the consumer.

In FIG. 1, a server 31 for mobile terminals controlling mobile terminals 30, 30, . . . represented by a cellular phone or the like is connected to the network 50, and each mobile terminal and the server 31 for mobile terminals are connected to each other through a wireless network 32.

The reference numeral 10 indicates an authentication server for checking and identifying an individual by decoding a signal transmitted from the mobile terminal 30, which is connected to the network 50 and also is connected the sale control server 23 through a dedicated line 60. The reference numeral 11 indicates a mail server used mainly for receiving image information, and a memory medium 12 for the mail server 11 is displayed in the figure together with a folder 13 provided therein.

Figure 2:
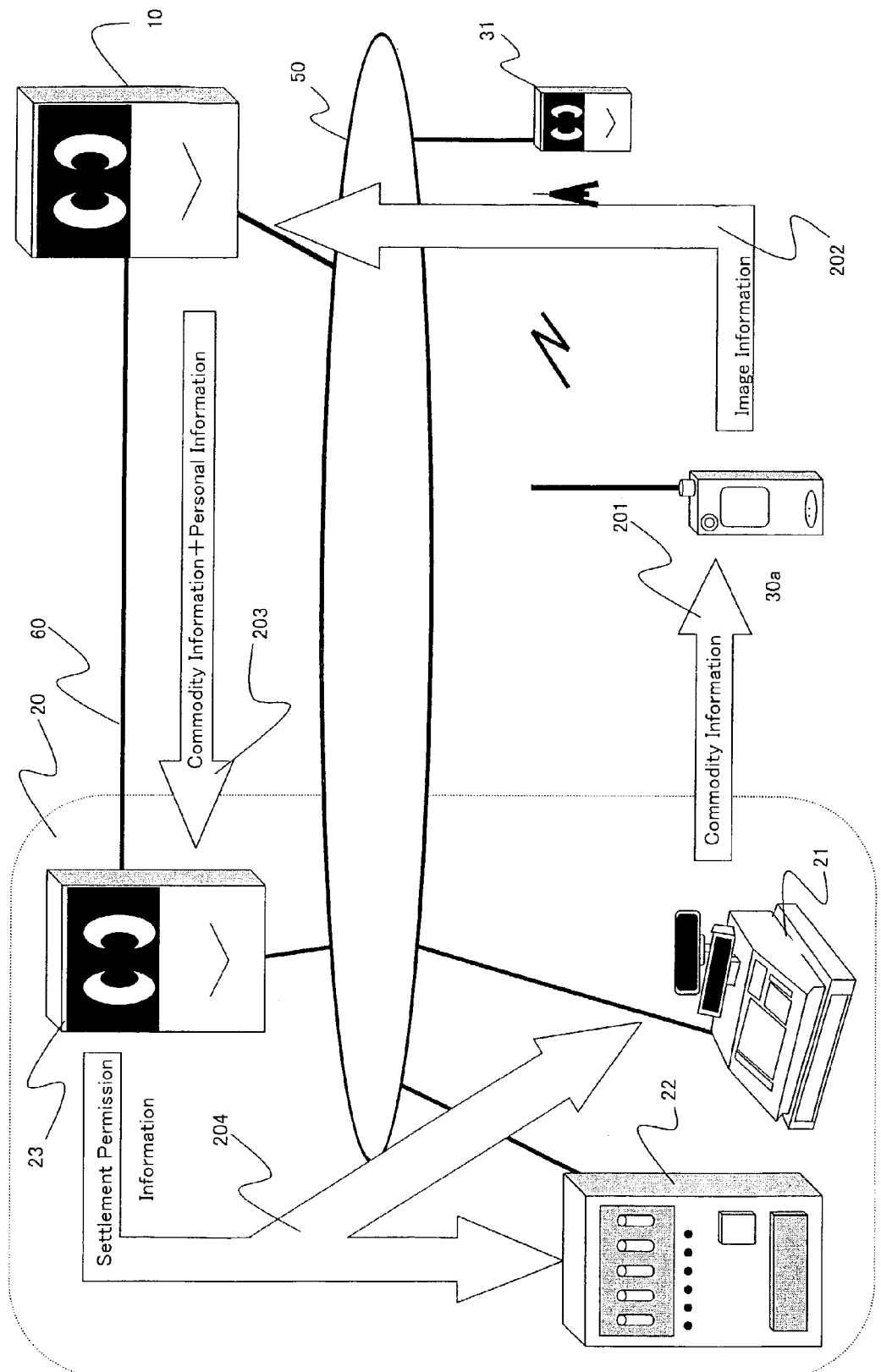
FIG. 2 is an explanatory view showing the basic principles in the electronic settlement method according to the present invention.

A basic flow in the settlement system according to the present invention is described below with reference to FIG. 2.

In this invention, the mobile terminal 30 incorporates therein an artificial retina sensor module 30a (described sometimes as retina chip hereinafter, and including a compact image pick-up element such as the CCD or CMOS area image sensor), and picks up the commodity (service) information computed by the display unit 21 (or a display unit of the automatic selling machine 22) and displayed thereon as image data (Route 201).

Figure 6:
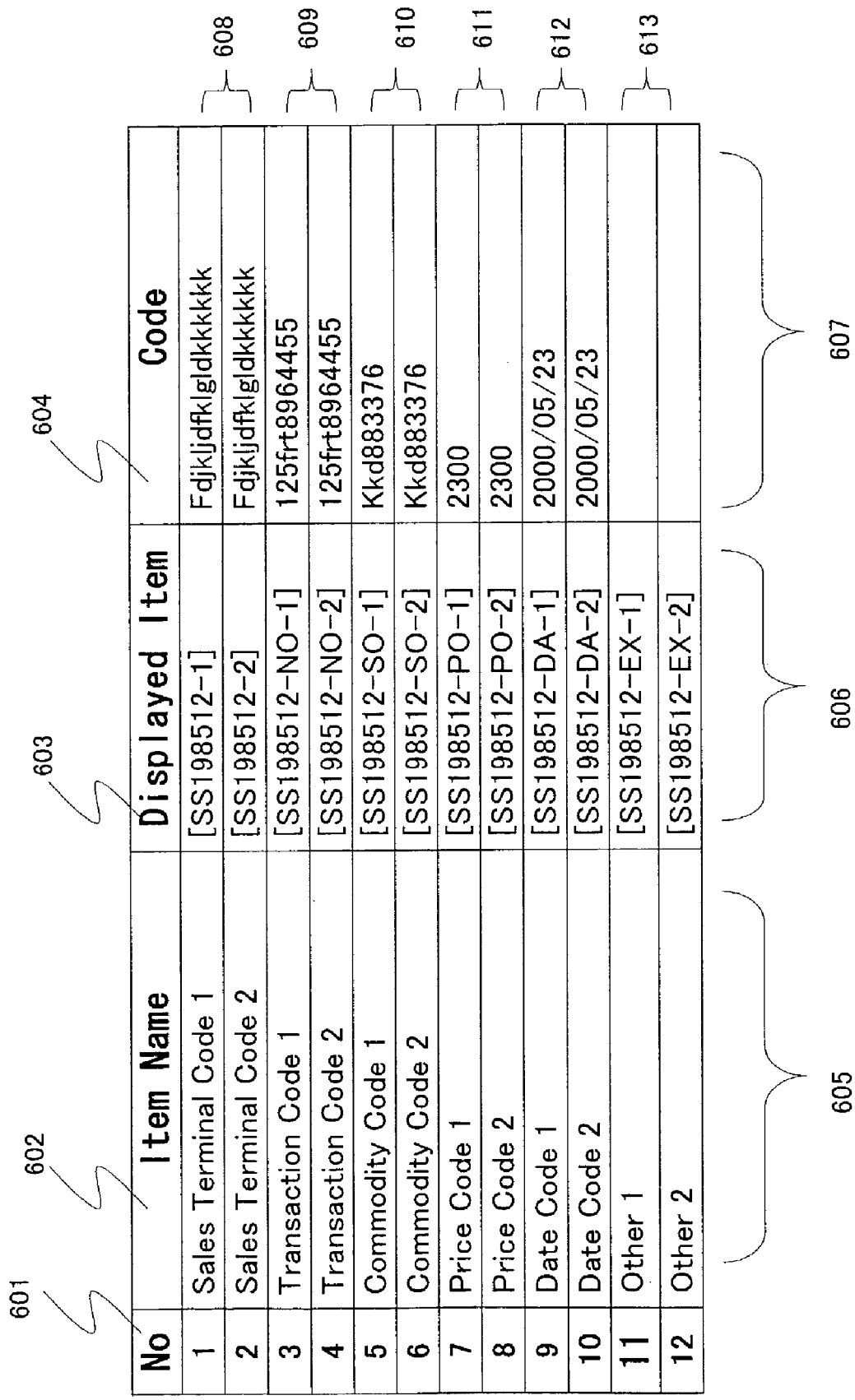
FIG. 6 is a view showing an example of commodity information displayed in a tabular format on the display unit 21.

The commodity (service) information shown in a tabular form in FIG. 6 for convenience of description includes columns with item no. 601, item name 602, displayed item name 603, and code 604 arrayed in the horizontal direction, and the multiplexed records are indicated by the reference numerals 608 to 613. Items No. 1 and No. 2 (608), items No. 3 and No. 4 (609), items No. 5 and No. 6 (610), items No. 7 and No. 8 (611), item No. 9 and item No. 10 (612) are substantially duplicated (duplexed) to prevent the data from being read erroneously in the image pick-up step described below. In other words, only when it is determined that code values for items No. 1 and No. 2 expressed as alpha-numerical values after the image is picked up are identical, the image pick-up process is finished, and otherwise a request for re-transmission of the signal is automatically issued. The same processing sequence is performed also for other items (609, 610, 611, and 612).

The item name group 605, displayed item name group 606, and code group 607 are shown as examples of the respective contents in the figure.

After the contents of the commodity information is checked, it is desirable to encrypt the information prior to the image pick-up step.

Figure 3:
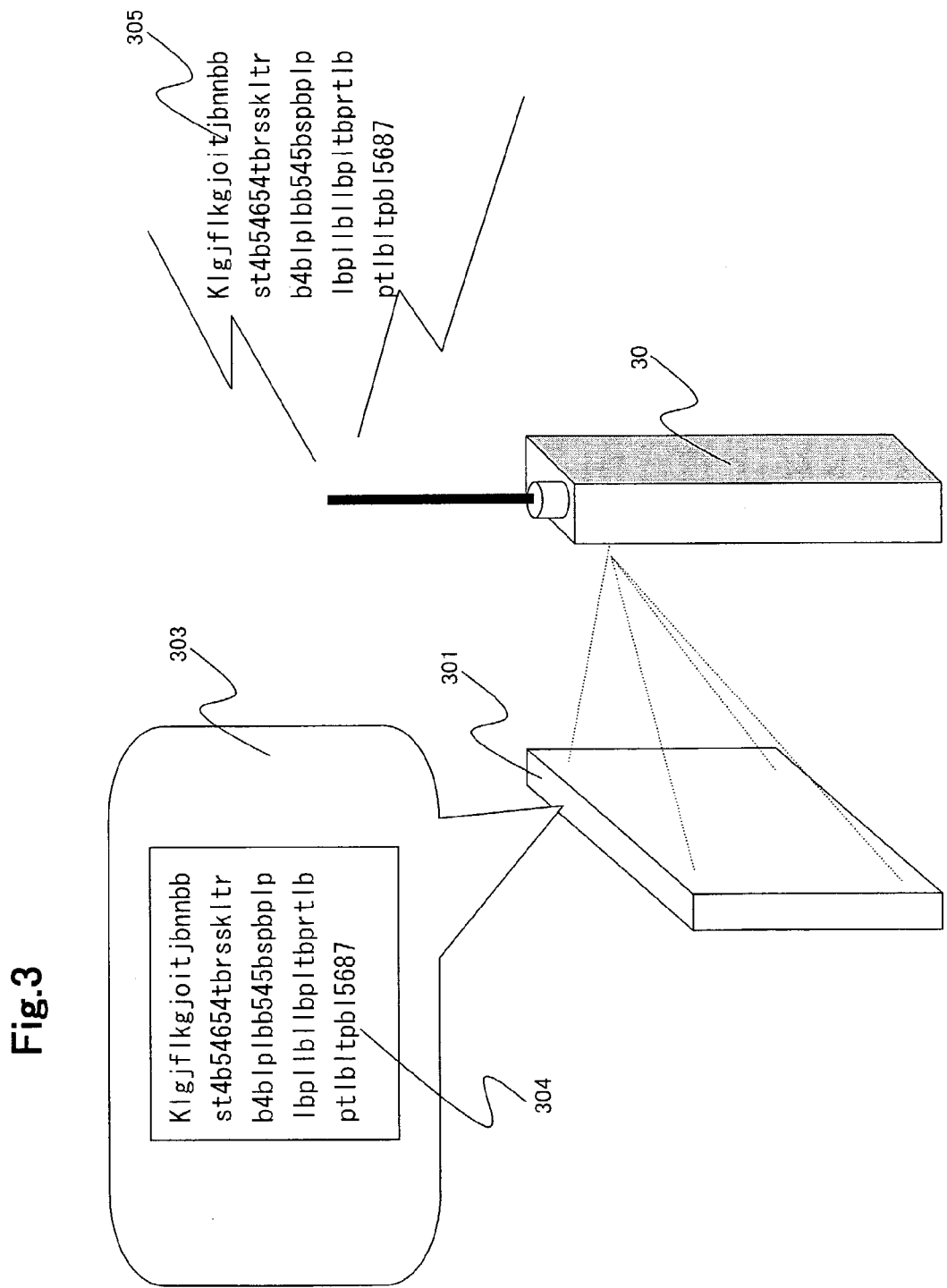
FIG. 3 is a view showing an example of the content displayed on a monitor screen of the display unit 21.

In FIG. 3, a screen 303 displayed for a liquid crystal screen 301 or the like in the display unit 21, displayed contents 304, and data 305 transmitted from the mobile terminal 30 are shown. The commodity selling and purchase information should preferably be encrypted to alpha-numerical characters as shown in this figure, but as the commodity selling and purchase information consisting of characters is converted to image data after the image is picked up, it is not always required to encrypt the information. A display with Kanji (Chinese characters) and Kana (Japanese characters) may erroneously be recognized in the image recognition processing, so that alpha-numeral characters are preferable.

Any type of display unit many be used as the display unit 21 so long as it can display the commodity selling and purchase information, so that a monitor for a personal computer connected to the Internet may be used as the display unit 21.

The image data is transmitted via the server 31 for mobile terminals which is a signal conversion server for connecting the mobile terminal 30 to the network 50 to the authentication server 10 (Route 202).

The image data received by the authentication server 10 is recognized as character data by the image recognition section provided in the authentication server 10, and the authentication server 10 authenticates the mobile terminal 30, and then transmits the commodity information and personal information to the sales control server 23 (Route 203). A communication route such authentication server the dedicated line 60 or the like not allowing external access such as the dedicated line 60 is selected for transmission of the types of information. In addition to the use of the dedicated line 60 for transmission of the information above, the security can further be enhanced by using an encryption system between two parties.

Finally, the sales control server 23 transmits the settlement permission information (through the Route 204) to the display unit 21 or other required system components according to the ordinary procedure provided by the credit company or other business organization, when the settlement is completed.

With the present invention, the display screen 303 of the display unit 21 is transmitted as an image signal from the mobile terminal 30 to the authentication server 10, so that the communication is never intercepted even when the communication is performed through a communication line with low security such as the Internet.

The authentication server 10 and the sales control sever 23 may sometimes be physically identical ones.

The method of fetching the image data and transmitting the fetched image data is described below.

Figure 4:
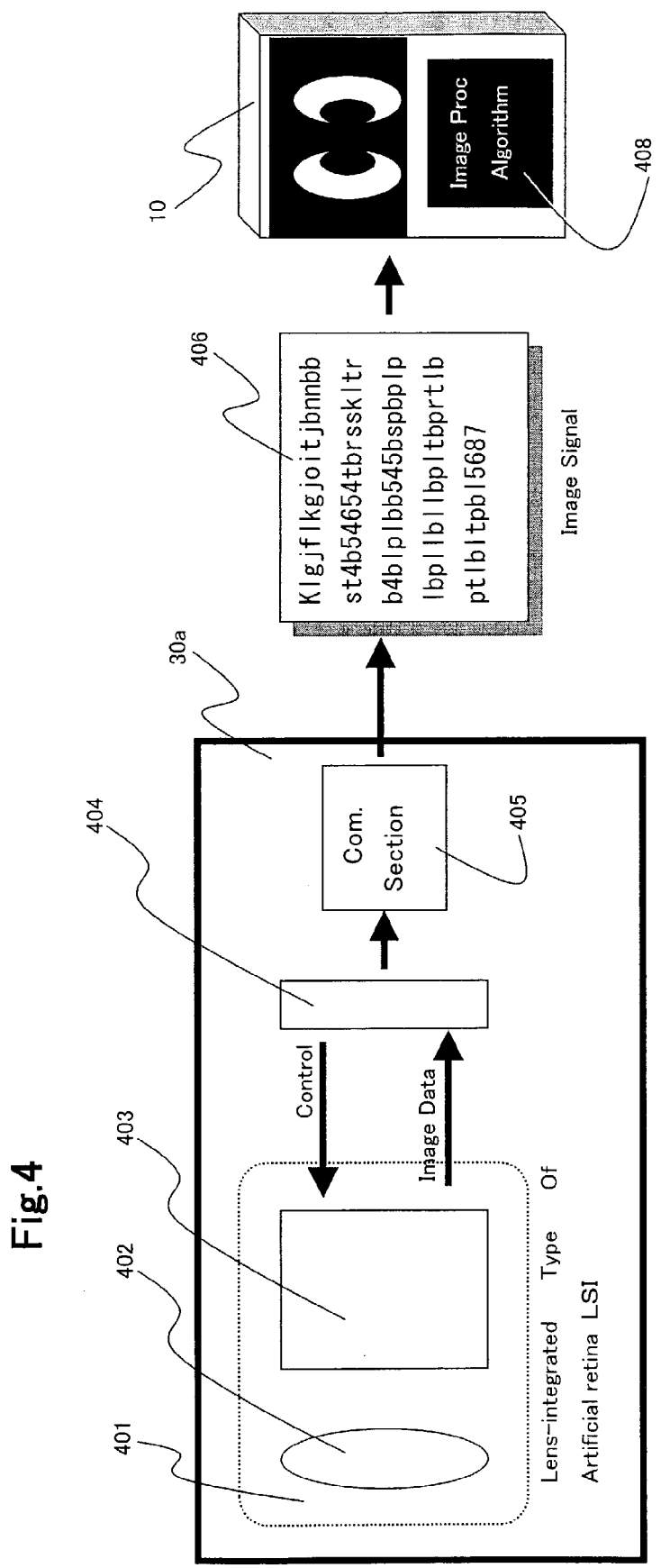
FIG. 4 is a block diagram showing internals of a mobile terminal with a built-in retina chip.

FIG. 4 shows configuration of the mobile terminal 30 with a built-in retina chip, and the mobile terminal 30 has, for the function for fetching and transmitting image data, a lens-integrated type of artificial retina LSI 401 comprising a lens 402 and an artificial retina LSI 403 integrated to each other, a control section 404 for the LSI 401, and a communication section 405. The authentication server 10 comprises an image processing algorithm mechanism 408, and the reference numeral 406 indicates an image of the image signal transmitted from the communication section 405 of the mobile terminal 30 to the authentication server 10.

The display screen 303 of the display unit 21 is photographed by the lens-integrated type of artificial retina LSI 401 of the mobile terminal 30, and is converted via the lens 402 to image data by the artificial retina LSI 403 operating under instructions from the control section 404, and is fetched into the control section 404. The image data is transmitted as an image signal as indicated by the image 406 via the communication section 405 to the authentication server 10, where the image data is reproduced as alphanumeric characters by the image processing algorithm mechanism 408 which is a portion of the internal mechanism.

Figure 5:
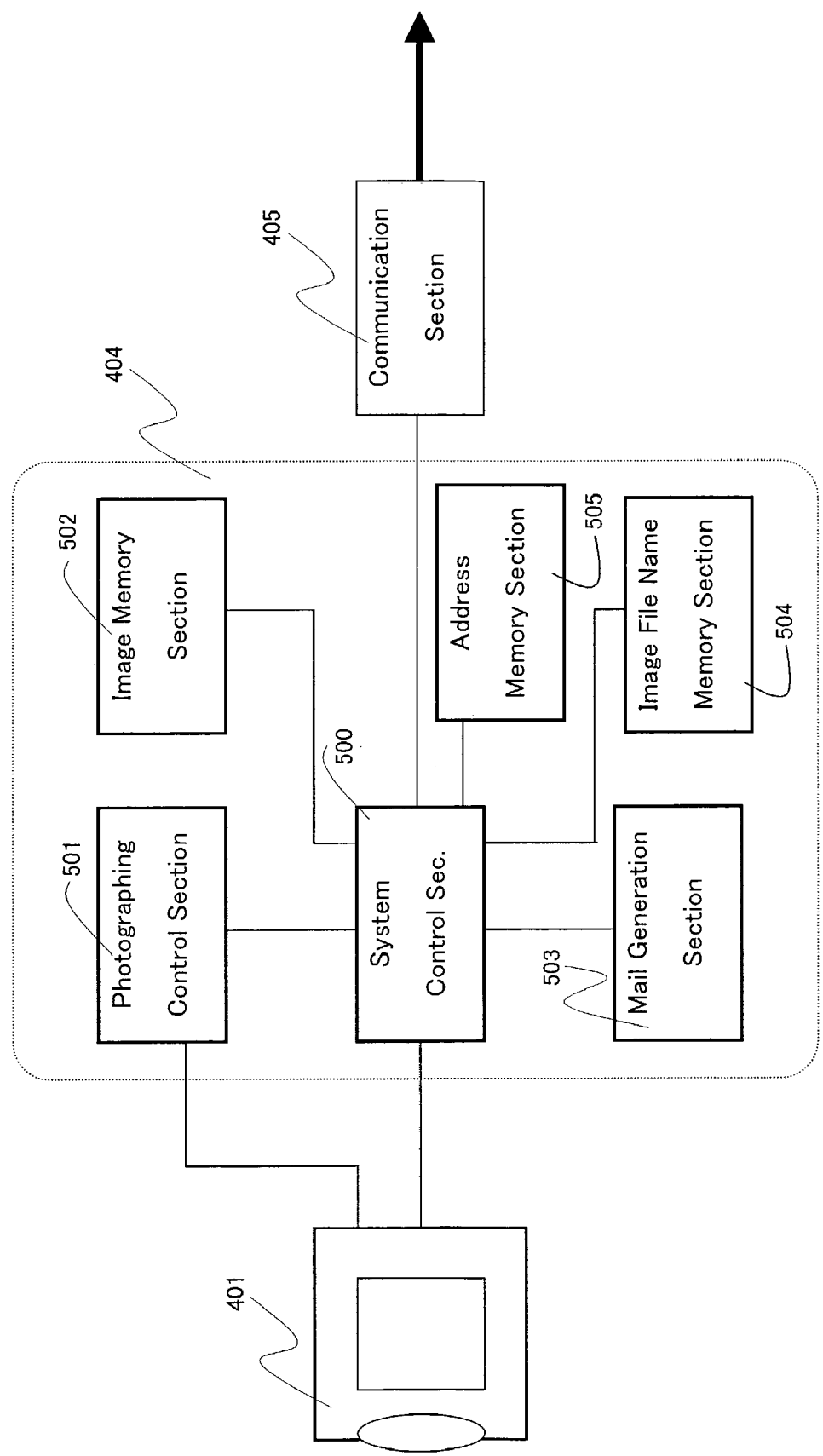
FIG. 5 is a software block diagram showing a control section of the mobile terminal with a built-in retina chip.

FIG. 5 is a software block diagram for the control section 404, and each time the authentication server 10 is accessed, the program stored in this section is transferred from the authentication server 10 to the control section 404 of the mobile terminal 30. The control section 404 comprises a system control section 500 for controlling the entire system, a photographing control section 501 for controlling the operation for 20 photographing an object image, an image memory section 502 for temporally storing the image data generated by photographing; an image file name memory section 504 for temporally storing therein a file name previously assigned to the image data from the authentication server 10; a mail generation section 503 for generating a mail relating the image data to the file name; and an address memory section 505 for storing a destination for transmission previously assigned from the authentication server 10 until the mail is transmitted.

Actions performed by the software program transferred from the authentication server 10 are described below assuming a case where a mobile terminal connected to the Internet is used.

When a specific service menu is selected on the mobile terminal 30 connected to the Internet, a program for controlling the mobile terminal 30 such as the Java program is transmitted from the authentication server 10 transmitting the menu, and the program is effected on the mobile terminal 30. Simultaneously when the menu is transmitted, the authentication server 10 also issues a file name and a mail address for the image data, which are transmitted together with the program and are stored in the image file name memory section 504 and the address memory section 505 respectively.

The lens-integrated type of artificial retina LSI 401 activates the photographing control section 501 upon an instruction from the system control section 500, and waits for an instruction for photographing. For instance, if an owner of the mobile terminal 30 selects the "photographing" item in the menu, photographing is started and performed by the photographing control section 501 having received the instruction from the system control section 500. It is needless to say that, if a shutter button is provided in the mobile terminal 30, photographing can be performed without depending on the menu program. The photographed image data is stored upon an instruction from the system control section 500 in the image memory section 502.

The system control section 500 instructs the mail generation section 503 to relate the stored image data to the file name, and then generates as a mail to be transmitted to the address stored in the address memory section 505. Then the system control section 500 instructs the communication section 405 to transmit the electronic mail (E-mail).

Figure 7:
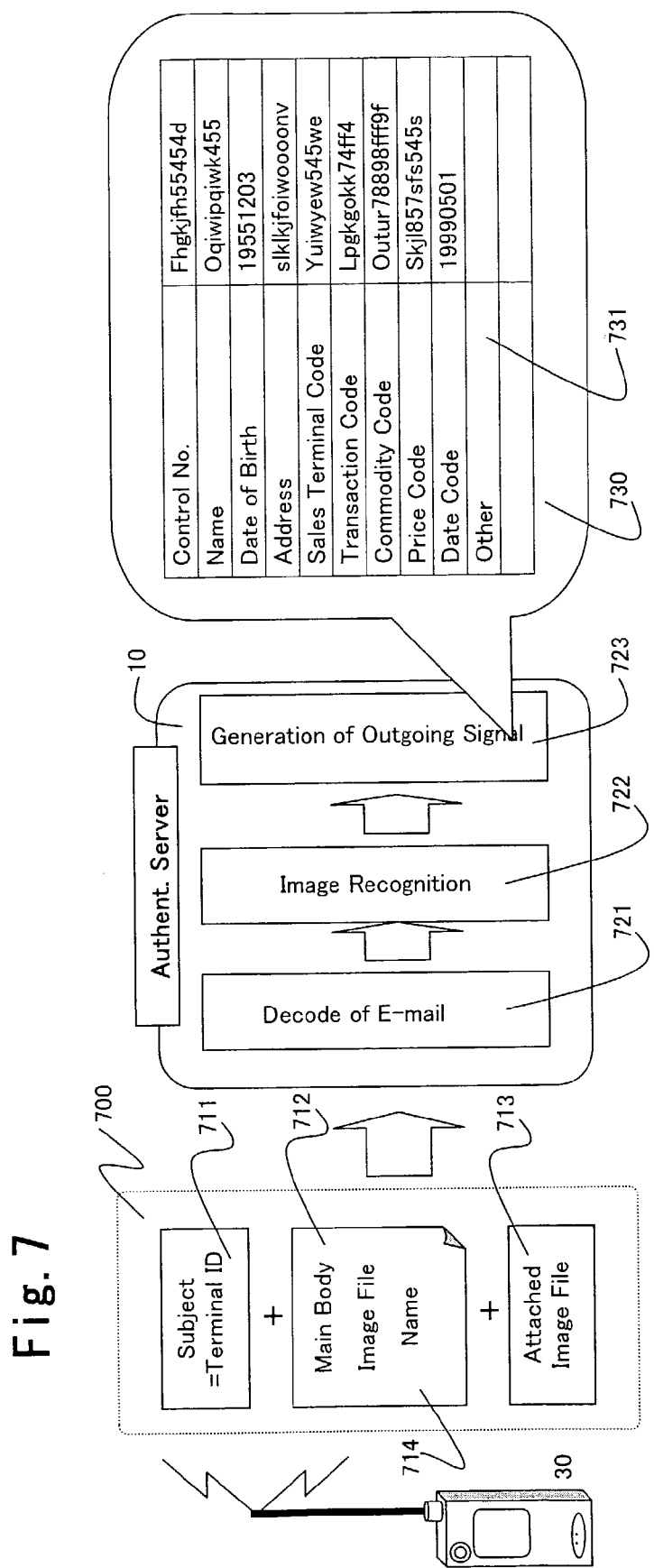
FIG. 7 is an explanatory view showing a flow of data transmitted from a mobile terminal via an authentication server to a sales control server.

FIG. 7 is an explanatory view showing a flow of data transmitted from the mobile terminal 30 via the authentication server 10 to the sales control server 23.

A terminal ID 711 specific to the mobile terminal 30 is inputted in a subject of the E-mail 700 transmitted from the mobile terminal 30 to the authentication server 10, and a main body 712 of the E-mail includes a image file name 714 of the attached image fie 713 fetched therein. Further, the photographed image data 305 (or 406) is attached as an attached image file 713 to the E-mail 700.

The authentication server 10 decodes the E-mail 700 as the synthesized signal described above to take out the original discrete signals therefrom (step 721), and recognizes the separated image data as character data (step 722), and generates converts the separated and decoded signals as an outgoing signal 730 including sales permission data 731 consisting of the personal authentication data and commodity data (step 723). This outgoing signal 730 is transmitted via the dedicated communication line 60 to the sales control server 23. The sales control server 23 determines whether the selling and purchase may be performed or not using a credit information means provided in the server 23 itself, and send the information concerning the result to the display units 21 or other related system components.

Figure 8:
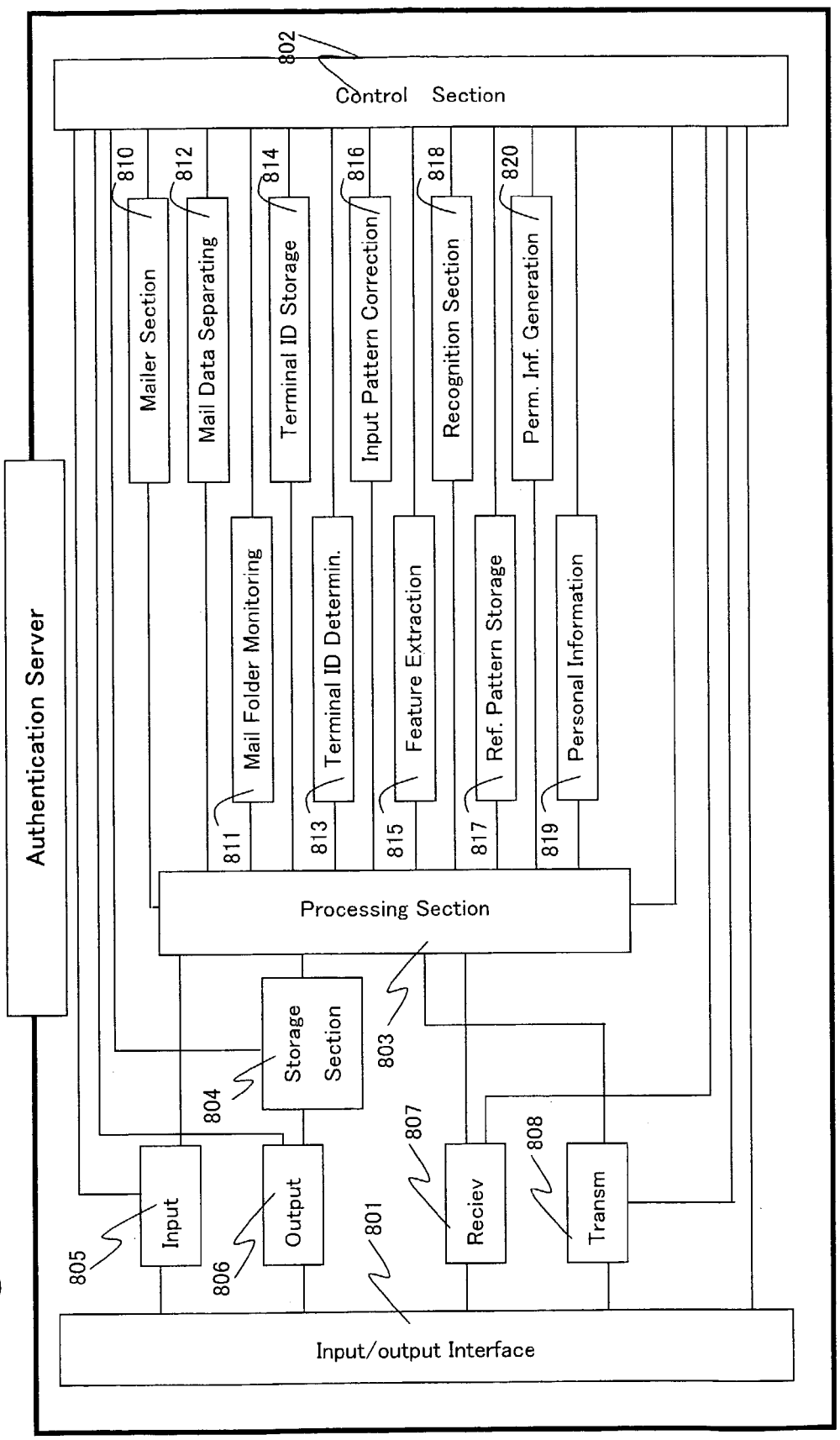
FIG. 8 is a block diagram showing configuration of the authentication server.

Configuration of the authentication server 10 is described below with reference to the block diagram shown in FIG. 8.

The authentication server 10 comprises, as components to be generally provided therein for processing, input/output, transmitting and receiving various types of data, a control section 802 for controlling operations of the entire authentication server 10, a processing section 803 for processing data, an input/output interface 801 connected to various types of input/output devices as well as to the network 50 or the like, an input section 805 for receiving data from the input/output interface 801, an output section 806 for outputting data, a storage section 804 for temporally storing therein the data in the data processing step, a receiving section 807 for receiving various data, and a transmission section 808 for transmitting various data.

The authentication server 10 further comprises, in addition to the components to be generally provided therein, a mail folder monitoring section 811 for monitoring whether the E-mail 700 from the mobile terminal 30 has arrived in a specified folder 13 of the mail server 11 or not; a mailer section 810 for fetching the in-coming mail into the authentication server 10; a mail data separating section 812 for decoding the in-coming data and separating the original discrete data therefrom; a terminal ID determination section 813 for determining whether the terminal ID separated from the in-coming mail is a previously registered one or not; a terminal ID storage section 814 in which the previously registered terminal ID is registered and stored; an input pattern correction section 816 for correcting the separated image data; a feature extraction section 815 for detecting features of image characters from the image data; a reference pattern storage section 817 for storing therein reference patterns for recognizing an image; a recognition section 818 for analyzing and recognizing the features as characters making use of the reference patterns stored in the reference pattern storage section 817; a personal information storage section 819 for storing therein personal information corresponding to the registered terminal ID; and a permission information generation section 820 for generating permission information consisting of commodity information and personal information.

Actions of the authentication server 10 are described below.

The E-mail 700 with the image file 713 attached thereto comes into a specified folder 13 in the mail server 11 in FIG. 1. The mail folder monitoring section 811 having detected arrival of the E-mail 700 reports the arrival of the E-mail to the control section 802. The control section 802 having received the report instructs the processing section 803 to transfer the in-coming mail to the memory section 804 by the mailer section 810. The transferred mail is divided by the mail data separation section 812 to discrete data concerning a terminal ID, an image file, and a image file name.

Of the separated data, at first the terminal ID determination section 813 verifies the terminal ID data to the terminal ID storage section 814 to check whether the data is registered one or not.

When it is determined that the terminal ID data is not registered one, information concerning the fact is transmitted to the sales control server 23, and the display unit 21 or other related system components reject business transaction for the commodity or the service.

When it is determined that the terminal ID data is registered one, as the next step the image file is delivered from the image recognition block to the permission information generation section 820. Namely, in the image recognition block, at first image correction for the image file is performed by the input pattern correction section 816, and after features as characters are extracted by the feature extraction section 815, character recognition is performed by the recognition section 818 based on the extracted features and making use of the reference patterns stored in the reference pattern storage section 817 to restore the image data to the commodity data. In this step, the recognition section 818 also verifies the multiplexed data to determine whether the recognition has been performed correctly or not.

Then the permission information generation section 820 fetches individual attribute information corresponding to the terminal ID from the personal information storage section 819, synthesizes the information with the commodity data obtained from the image file, and generates an outgoing signal 730 containing the sales permission data 731 shown in FIG. 7. This outgoing signal 730 is transmitted by the processing section 803 via the transmission section 808 and the input/output interface 801 to the sales control server 23.

Description of the embodiment above assumes a case in which all of selling and purchase data displayed on the display unit (register) 21 is transmitted as image data from the mobile terminal 30 to the authentication server 10, but it is not always required to send all of the selling and purchase data. For instance, the configuration is allowable in which commodity information is defined in detail in both the display unit (register) 21 at the site of sales and the sales control server 23. In this case, when the mobile terminal 30 is authenticated by the authentication server 10, the information concerning the fact is sent to the sales control server 23 for completing the operating sequence for payment (settlement). In this type of method, a work load to the image recognition block in the authentication server 10 can be alleviated.

What is claimed is:

1. A method of electronic settlement comprising:

setting a system in which commodity information display units installed at sites for payment, a sales control server for controlling the display units, a server for controlling mobile terminals each incorporating therein an electronic camera or an artificial retina chip, and an authentication server for authenticating the mobile terminals, are connected through a network, and also in which the authentication server and the sales control server are connected to each other through a dedicated communication line and wherein electronic settlement is performed by using the mobile terminals, said method comprising the steps of:

photographing by a mobile terminal commodity information including characters which are displayed on the display unit;

transmitting photographed image data taken by the mobile terminal via the mobile terminal server to the authentication server;

authenticating the mobile terminal and restoring the image data to the commodity information including characters at the authentication server; and transmitting authenticated personal information and the commodity information via the dedicated communication line from the authentication server to the sales control server.

2. The electronic settlement method according to claim 1, wherein encrypted commodity information consisting of characters is displayed on the display unit.

3. The electronic settlement method according to claim 1, wherein duplexed commodity information consisting of characters is displayed on the display unit.

4. An authentication server used for the electronic settlement method according to claim 1, said authentication server comprising a mail folder monitoring section for monitoring arrival of an electronic mail containing a terminal ID for the mobile terminal and the image data; a terminal ID storage section for previously registering and storing the terminal ID therein; a personal information storage section for storing therein personal information corresponding to the registered terminal ID; a terminal ID determination section to determine by analyzing the incoming mail whether the terminal ID is registered one or not; an image recognition block for recognizing the image data and restoring the image data as commodity data including characters; and a permission information generation section for generating permission information comprising the commodity information and the personal information.

5. A mobile terminal used for the electronic settlement method according to claim 1, said mobile terminal comprising an artificial retina chip with a lens and an artificial retina LSI integrated therein, a control section for the artificial retina chip, and a communication section, wherein a program constituting the control section comprises a system control section for controlling the entire system, a photographing control section for controlling photographing, and an image memory section for temporally storing therein photographed image data.

6. The electronic settlement method according to claim 1, further comprising:

registering and storing terminal ID in the authentication server;

storing personal information corresponding to the registered terminal ID in the authentication server;

monitoring arrival of an electronic mail containing a terminal ID for the mobile terminal and image data;

analyzing the incoming mail and determining whether the terminal ID is registered or not;

recognizing the image data and restoring the image data as commodity data; and generating permission information comprising the commodity information and the personal information.

7. The electronic settlement method according to claim 1, further comprising transmitting settlement permission information from the sales control server to the display unit.

* * * * *